(12) United States Patent
Kanegae

(10) Patent No.: US 11,838,439 B2
(45) Date of Patent: Dec. 5, 2023

(54) CALL PROCESSING APPARATUS, ORIGINATION NUMBER CONVERTING METHOD, AND ORIGINATION NUMBER CONVERTING PROGRAM

(71) Applicant: Nippon Telegraph and Telephone Corporation, Tokyo (JP)

(72) Inventor: Shunsuke Kanegae, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/801,451

(22) PCT Filed: Feb. 25, 2020

(86) PCT No.: PCT/JP2020/007379
§ 371 (c)(1),
(2) Date: Aug. 22, 2022

(87) PCT Pub. No.: WO2021/171343
PCT Pub. Date: Sep. 2, 2021

(65) Prior Publication Data
US 2023/0096481 A1    Mar. 30, 2023

(51) Int. Cl.
*H04M 11/04* (2006.01)
*H04M 3/42* (2006.01)
(52) U.S. Cl.
CPC ............. *H04M 11/04* (2013.01); *H04M 3/42* (2013.01)
(58) Field of Classification Search
CPC .... H04M 11/04; H04M 3/42; H04M 3/42068; H04M 3/42357; H04M 2242/30

USPC ...................................................... 455/404.1
See application file for complete search history.

(56) References Cited

U.S. PATENT DOCUMENTS

| | | | | |
|---|---|---|---|---|
| 7,912,185 | B2* | 3/2011 | Stanners | H04M 3/42 379/37 |
| 2003/0045306 | A1* | 3/2003 | Himmel | H04M 3/42 455/445 |
| 2005/0101347 | A1* | 5/2005 | Prudent | H04W 88/021 455/554.1 |
| 2007/0206571 | A1* | 9/2007 | Silver | H04W 4/16 370/352 |
| 2019/0312976 | A1* | 10/2019 | Vagelos | H04M 7/0066 |

OTHER PUBLICATIONS

Ministry of Internal Affairs and Communications [online], "Emergency call function," soumu.go.jp, 2009, retrieved from URL <http://www.soumu.go.jp/menu_seisaku/ictseisaku/net_anzen/hijyo/tuho.html>, 17 pages (with English Translation).

* cited by examiner

*Primary Examiner* — Maria El-Zoobi
(74) *Attorney, Agent, or Firm* — Fish & Richardson P.C.

(57) ABSTRACT

A call processing device includes: a conversion unit configured to convert a caller number of an emergency call sent from a terminal accommodation device via a wireless access line into a land line telephone number of a terminal accommodated by the terminal accommodation device; a connection unit configured to connect the emergency call with the converted caller number to an emergency service; and a notification unit configured to acquire an address corresponding to the land line telephone number and notify the emergency service of the address.

8 Claims, 4 Drawing Sheets

CALL PROCESSING APPARATUS, ORIGINATION NUMBER CONVERTING METHOD, AND ORIGINATION NUMBER CONVERTING PROGRAM

CROSS-REFERENCE TO RELATED APPLICATIONS

This application is a National Stage application under 35 USC § 371 of International Application No. PCT/JP2020/007379, having an International Filing Date of Feb. 25, 2020. The disclosure of the prior application is considered part of the disclosure of this application, and is incorporated by reference in its entirety into this application.

TECHNICAL FIELD

The present disclosure relates to a call processing device, a caller number conversion method, and a caller number conversion program.

BACKGROUND ART

In IP telephone services, telecommunication service providers notify emergency services of positional information of callers and telephone numbers of the callers to call them back at the time of emergency calls such as 110 and 119 (NPL 1).

There are communication service providers providing IP telephone services using land line telephone numbers which have been used in the past by connecting land line telephone terminals to wireless telephone units. Thus, IP telephone services in which wireless access lines are used can be used for land line telephone terminals.

CITATION LIST

Non Patent Literature

[NPL 1] Ministry of Internal Affairs and Communications, "Function of Emergency Call", [online], Internet <http://www.soumu.go.jp/menu_seisaku/ictseisaku/net_anzen/hijyo/tuho.html>

SUMMARY OF THE INVENTION

Technical Problem

When emergency calls are made by telephone services using land line telephone networks, emergency services are notified of land line telephone numbers and addresses of contractors as information of callers. When emergency calls are made by IP telephone services, emergency services are notified of telephone numbers and positional information of mobile objects as information of callers.

Here, when land line telephones with wireless access lines make emergency calls using IP telephone services, emergency services are notified of telephone numbers and positional information of mobile objects (wireless telephone units) and are not notified of land line telephone numbers and addresses of the land line telephones.

The present disclosure has been made in view of the above-described circumstances, and an object of the present disclosure is to provide a call processing device, a caller number conversion method, and a caller number conversion program that notify an emergency service of a land line telephone number and an address of a land line telephone when an emergency call is sent from the land line telephone with a wireless access line.

Means for Solving the Problem

To achieve the above-described object, a call processing device according to an aspect of the present disclosure includes: a conversion unit configured to convert a caller number of an emergency call sent from a terminal accommodation device via a wireless access line into a land line telephone number of a terminal accommodated by the terminal accommodation device; a connection unit configured to connect the emergency call with the converted caller number to an emergency service; and a notification unit configured to acquire an address corresponding to the land line telephone number and notify the emergency service of the address.

A caller number conversion method according to another aspect of the present disclosure is a caller number conversion method performed by a call processing device, and the method includes: converting a caller number of an emergency call sent from a terminal accommodation device via a wireless access line into a land line telephone number of a terminal accommodated by the terminal accommodation device; connecting the emergency call with the converted number to an emergency service; and acquiring an address corresponding to the land line telephone number and notifying the emergency service of the address.

According to still another aspect of the present disclosure, a caller number conversion program causes a computer to function as the above-described call processing device.

Effects of the Invention

According to the present disclosure, it is possible to provide a call processing device, a caller number conversion method, and a caller number conversion program that notify an emergency service of a land line telephone number and an address of a land line telephone number when an emergency call is sent from the land line telephone with wireless access line.

DESCRIPTION OF EMBODIMENTS

Hereinafter, embodiments of the present disclosure will be described with reference to the drawings.

(Overview of Call Processing System)

Figure 1:
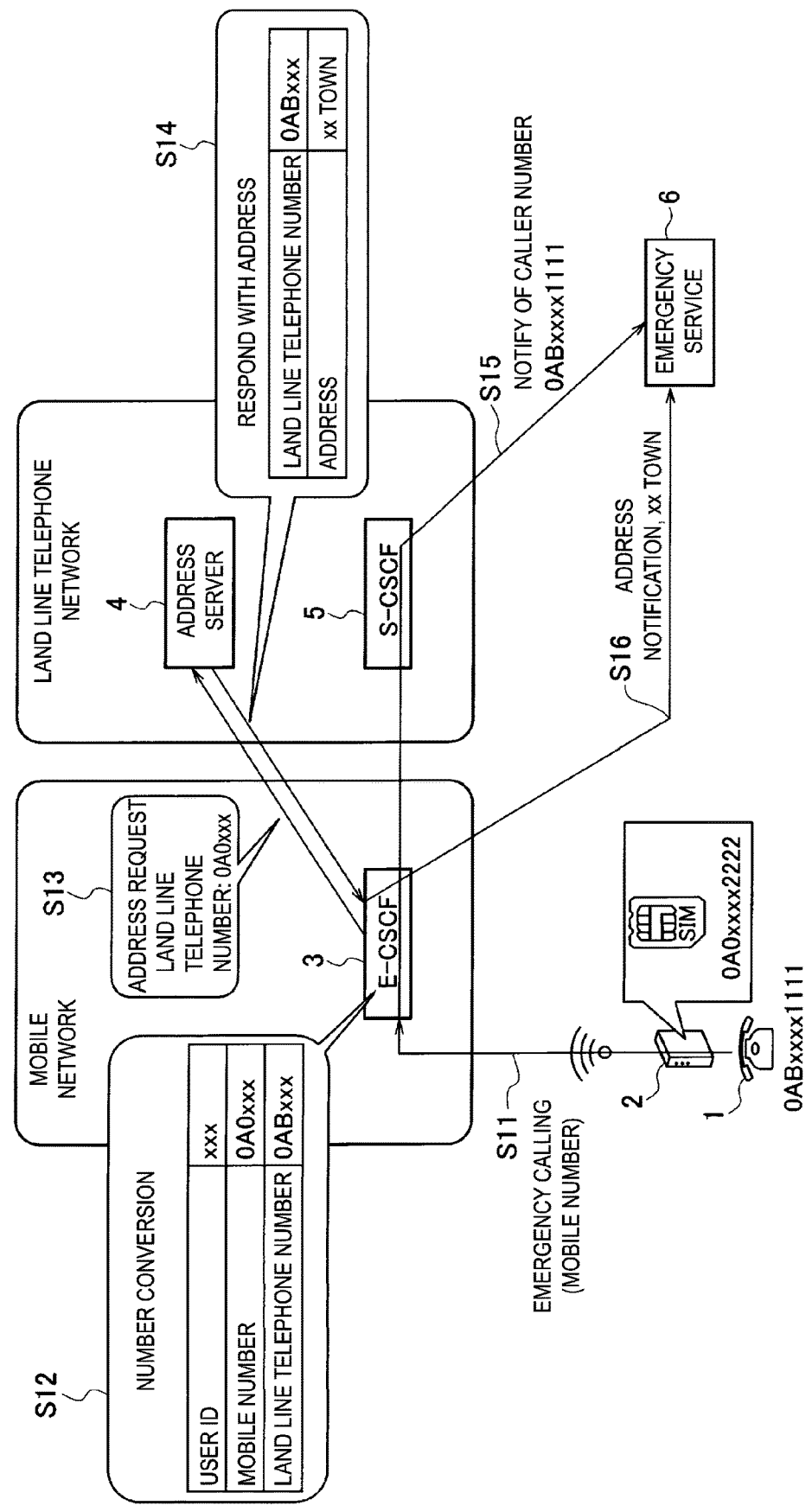
FIG. 1 is a diagram illustrating an overview of a call processing system according to an embodiment of the present disclosure.

FIG. 1 is a diagram illustrating an overview of a call processing system according to the embodiment. An Emergency-Call Session Control Function (E-CSCF) 3 is provided in a mobile network, and an address server 4 and an S-CSCF 5 are provided in a land line telephone network.

When receiving a notification of a special emergency number (for example, 110 or the like) dialed by a land line telephone terminal 1, a terminal accommodation device 2 transmits, to the E-CSCF 3, an emergency call with the mobile phone number (hereinafter referred to as a "mobile number") set in a subscriber identity module (SIM) as a caller number(S11). The mobile number is the number with a "0A0" format. The land line telephone number of the terminal 1 is the number with a "0AB-J" format.

The E-CSCF 3 is a session initiation protocol (SIP) server having an emergency call routing function. When receiving the emergency call of S11, the E-CSCF 3 retrieves a conversion table using a mobile number as a retrieval key and acquires a corresponding land line telephone number of the terminal 1. Then, the E-CSCF 3 converts the caller number of the received emergency call from the mobile number into the land line telephone number of the terminal 1 (S12).

The E-CSCF 3 connects the emergency call of which the caller number is converted in S12 to an emergency services 6 via the S-CSCE 5 (S15). A Serving-Call Session Control Function (S-CSCF) 5 is an SIP server that performs routing in a call reception destination. The S-CSCF 5 relays an emergency call to an emergency service designated with an incoming number of an emergency call.

The E-CSCF 3 transmits a retrieval request to the address server 4 using the land line telephone number converted in S12 as a retrieval key (S13). The address server 4 retrieves an address corresponding to the retrieval key and transmits the address to the E-CSCF 3 (S14). The E-CSCF 3 transmits the address acquired in S14 to the emergency service 6 (S16). In this way, according to the embodiment, the emergency service 6 can be notified of the land line telephone number of the terminal 1 and the address of a user (a subscriber) of the terminal 1.

Figure 2:
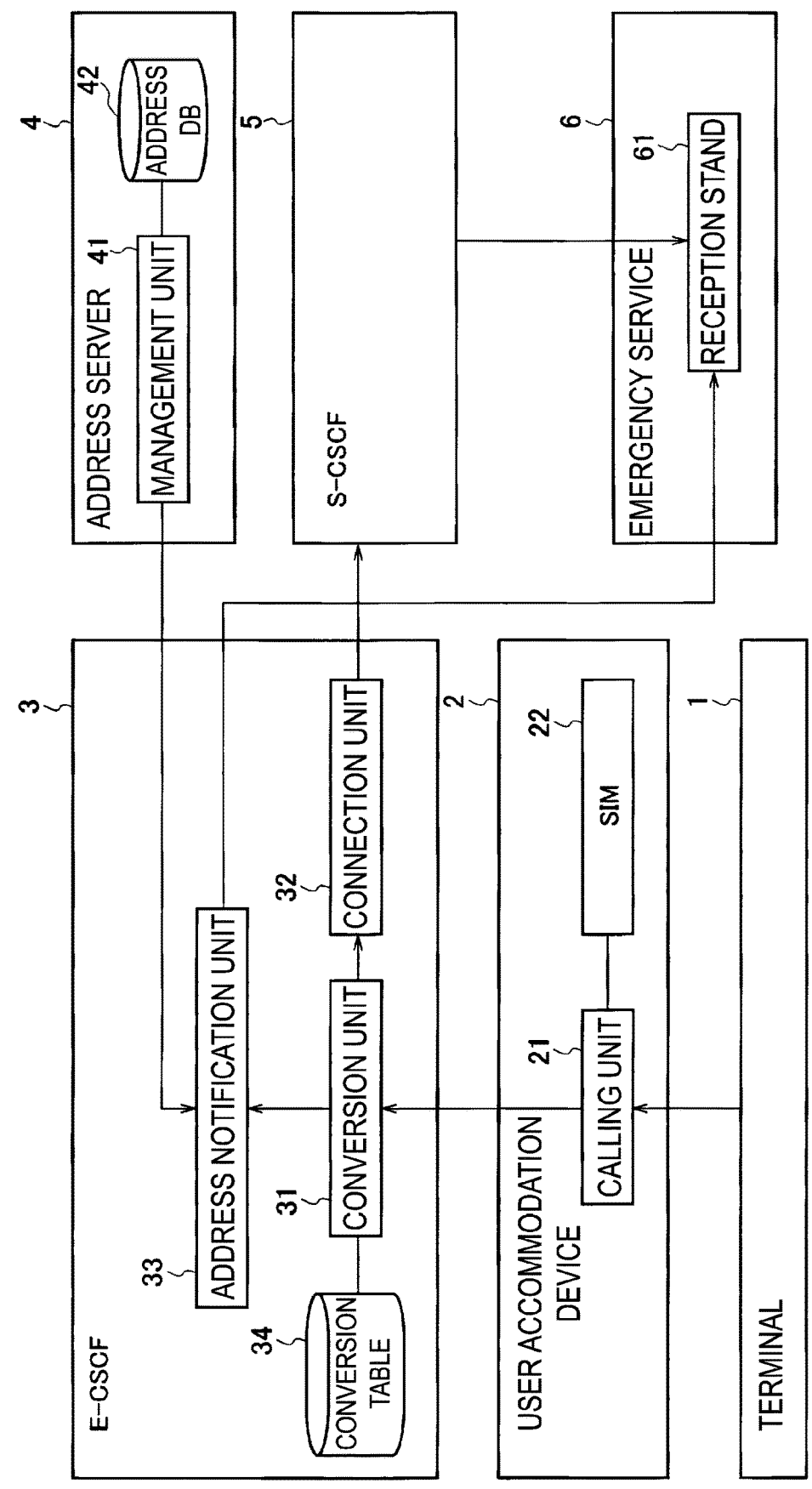
FIG. 2 is a diagram illustrating an overall configuration of the call processing system.

(Configuration of Call Processing System) FIG. 2 is a diagram illustrating a configuration of a call processing system according to the embodiment. The illustrated call processing system includes the terminal 1, the terminal accommodation device 2, the E-CSCF 3, the address server 4, the S-CSCF 5, and the emergency service 6.

The terminal 1 is a land line telephone terminal in which a wireless access line is used. The terminal 1 is connected to a terminal accommodation device 2 by an RJ-45 or the like and the terminal accommodation device 2 sends a call from the terminal 1 using the wireless access line. The terminal 1 notifies the terminal accommodation device 2 of a dial number (an incoming number) dialed by a user. In the embodiment, the terminal 1 notifies the terminal accommodation device 2 of a special emergency number for an emergency call. The special emergency number is 110, 118, 119, or the like and is a telephone number whose destination is a reception stand 61 of the emergency service 6 such as police set.

The terminal accommodation device 2 accommodates the terminal 1 and is wirelessly connected to a mobile network. The illustrated terminal accommodation device 2 includes a calling unit 21 and an SIM 22. In the SIM 22, a mobile number (number 0A0) is set. When the terminal 1 notifies of a special emergency number, the calling unit 21 accesses the SIM 22 and acquires a mobile number stored in the SIM 22. Then, the calling unit 21 sends an emergency call in which the mobile number is set as the caller number to the E-CSCF 3 via the wireless access line and transmits a connection request of the emergency call.

The E-CSCF 3 (call processing device) is an emergency call SIP server provided in a mobile telephone network. The illustrated E-CSCF 3 includes a conversion unit 31, a connection unit 32, an address notification unit 33, and a conversion table 34 (number storage unit).

The conversion unit 31 converts the caller number of the emergency call sent from the terminal accommodation device 2 via the wireless access line into the land line telephone number (number "0AB-J") of the terminal 1 accommodated by the terminal accommodation device 2. For example, the conversion unit 31 may convert, using the conversion table 34, the mobile number set in the caller number of the emergency call into the land line telephone number of the terminal 1. Specifically, the conversion unit 31 retrieves the conversion table using the mobile number set in the caller number of the emergency call as a retrieval key and acquires the land line telephone number corresponding to the mobile number.

In the conversion table 34, the mobile number of the terminal accommodation device 2 and the land line telephone number of the terminal 1 are stored in association with each other. Specifically, the conversion table 34 stores a pair of a mobile number of the terminal accommodation device 2 and a land line telephone number of the terminal accommodated in the terminal accommodation device 2 for each user (user ID) of a terminal in which a wireless access line is used. The conversion table 34 does not store a mobile number of a mobile object (a mobile terminal) such as a smartphone which does not use the terminal accommodation device 2.

The connection unit 32 connects, to the emergency service 6, an emergency call of which caller number is converted. Specifically, the connection unit 32 transmits the converted emergency call to the S-CSCF 5 and connects the converted emergency call to the reception stand 61 of the emergency service 6 via the S-CSCF 5. Thus, the E-CSCF 3 can notify the emergency service 6 of the land line telephone number of the terminal 1 that is not the mobile number of the terminal accommodation device 2.

The address notification unit 33 acquires an address corresponding to the land line telephone number and notifies the emergency service 6 of the acquired address. Specifically, the address notification unit 33 accesses the address server 4 using the land line telephone number acquired by the conversion unit 31 as a retrieval key, acquires the address of a user (a subscriber) with a contract for the land line telephone number, and notifies the emergency service 6 of the acquired address. Thus, the E-CSCF 3 can notify the emergency service 6 of the address of the land line telephone number of the terminal 1 instead of positional information of the terminal accommodation device 2 (mobile object).

For example, the E-CSCF 3 and the emergency service 6 may be directly connected via a virtual private network (VPN) or the like and the address notification unit 33 may transmit the acquired address and land line telephone number to the reception stand 61 of the emergency service 6 via a communication route different from that of the emergency call.

The address server 4 is a server that is provided in a land line telephone network and stores the address of the terminal 1. The illustrated address server 4 includes a management unit 41 and an address DB 42. In response to a retrieval request from the E-CSCF 3, the management unit 41 retrieves the address DB 42 using the land line telephone number designated in the retrieval request as a retrieval key and transmits an address corresponding to the land line telephone number to the E-CSCF 3. In the address DB 42, an address of a user of the land line telephone number is stored for each land line telephone number.

The S-CSCF 5 is an SIP server provided in the land line telephone network and relays an emergency call transmitted from the E-CSCF 3 to the emergency service 6 designated with an incoming number of the emergency call.

The emergency service 6 is a service (for example, police, the Maritime Safety Agency, a fire station, or the like) to which an emergency call whose destination is a special emergency number is connected. The emergency service 6 includes the reception stand 61 (telephone terminal) to which an emergency call is connected.

(Operation of Call Processing System)

Hereinafter, an operation of the call processing system according to the embodiment will be described.

Figure 3:
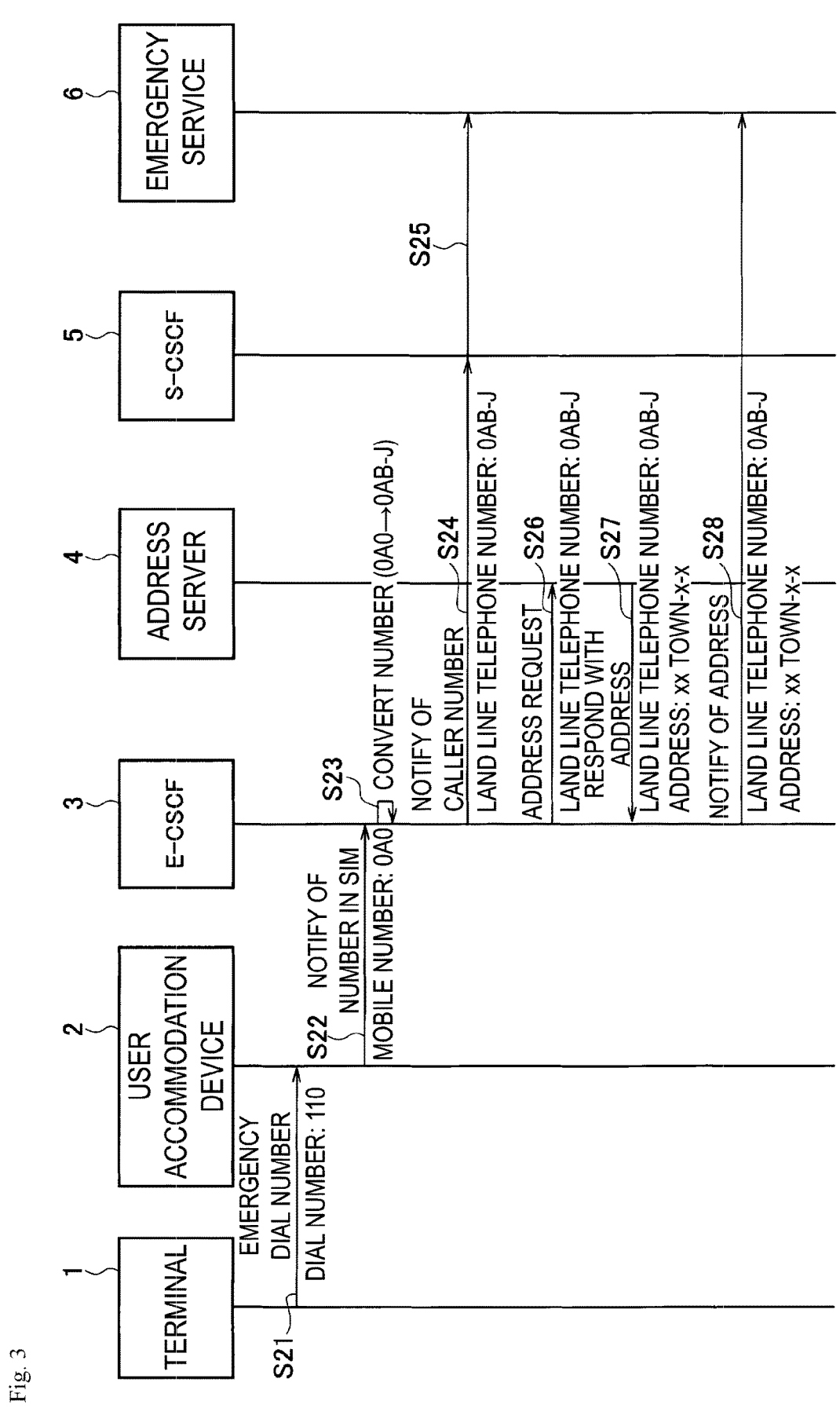
FIG. 3 is a sequence diagram illustrating an operation of the call processing system.

FIG. 3 is a sequence diagram illustrating an operation of the call processing system. Here, an operation in which the land line telephone terminal 1 notifies the emergency service 6 of an emergency call will be described.

The terminal 1 notifies the terminal accommodation device 2 of a special emergency number input by the user performing an operation such as pressing a button of the terminal 1 (S21). That is, the terminal 1 notifies the terminal accommodation device 2 of a dial number of the special emergency number.

When receiving the special emergency number is received from the terminal 1, the terminal accommodation device 2 sets the mobile number (number 0A0) stored in the SIM 22 of the terminal accommodation device 2 as a caller number and transmits the emergency call in which the special emergency number is set as the incoming number to the E-CSCF 3 (S22). Specifically, the terminal accommodation device 2 sets the mobile number of the SIM 22 in a From-header and transmits an INVITE message in which the special emergency number is set as a to-header to the E-CSCF 3. That is, the terminal accommodation device 2 notifies of the mobile number as the caller number of the emergency call.

When the emergency call is received, the E-CSCF 3 retrieves the conversion table using the caller number of the emergency call as a retrieval key and determines whether the caller number is in the conversion table. In the conversion table, a pair of the mobile number of the terminal accommodation device 2 (SIM 22) and the land line telephone number of the terminal 1 is stored. The E-CSCF 3 acquires the land line telephone number corresponding to the retrieval key from the conversion table and converts the caller number (number 0A0) of the emergency call received from the terminal accommodation device 2 into the acquired land line telephone number (number 0AB-J) (S23).

Then, the E-CSCF 3 transmits to the emergency service 6 via the S-CSCF 5*n* the emergency call whose caller number is converted (S24 and S25). Specifically, the E-CSCF 3 transmits the INVITE message in which the land line telephone number is set as the From-header to the emergency service 6. Thus, the E-CSCF 3 according to the embodiment can notify the emergency service 6 of the land line telephone number of the terminal 1.

When the caller number of the emergency call is not in the conversion table, the E-CSCF 3 determines that the emergency call is an emergency call from a mobile object terminal that is not a land line telephone. In this case, the E-CSCF 3 connects the emergency call to the emergency service 6 via the S-CSCF 5 without converting the caller number.

The E-CSCF 3 acquires the address of the user of the land line telephone number converted in S23 from the address server 4 (S26). Specifically, the E-CSCF 3 transmits a retrieval request to the address server 4 using the land line telephone number as a retrieval key. The address server 4 transmits the address corresponding to the land line telephone number designated with the retrieval request to the E-CSCF 3 (S27).

The E-CSCF 3 transmits the land line telephone number and the address to the emergency service 6 (S28). Here, the E-CSCF 3 notifies the emergency service 6 of the address using a communication route, a signal, and a timing different from those of the connection of the emergency call of S24 and S25. For example, the E-CSCF 3 and the emergency service 6 are directly connected via a virtual private network (VPN), and the E-CSCF 3 transmits the address and the land line telephone number acquired using HTTP of POST, or the like to the emergency service 6 after the connection of the emergency call.

Effects of Embodiment

According to the above-described embodiment, the E-CSCF 3 includes: the conversion unit 31 that converts a caller number of an emergency call sent from the terminal accommodation device 2 via a wireless access line into a land line telephone number of a terminal 1 accommodated by the terminal accommodation device 2; the connection unit 32 that connects, to the emergency service 6, the emergency call whose caller number is converted; and the notification unit 33 that acquires an address corresponding to the land line telephone number and notifies the emergency service 6 of the address.

Thus, according to the embodiment, when an emergency call is sent from a land line telephone in which a wireless access line is used, the emergency service 6 can be notified of the land line telephone number of an address of a user of the land line telephone.

According to the embodiment, even for an emergency call from a land line telephone in which a wireless access line is used, the emergency service 6 can be notified easily of the land line telephone number and the address without changing a system or an operation order on the emergency service 6.

(Hardware Configuration)

Figure 4:
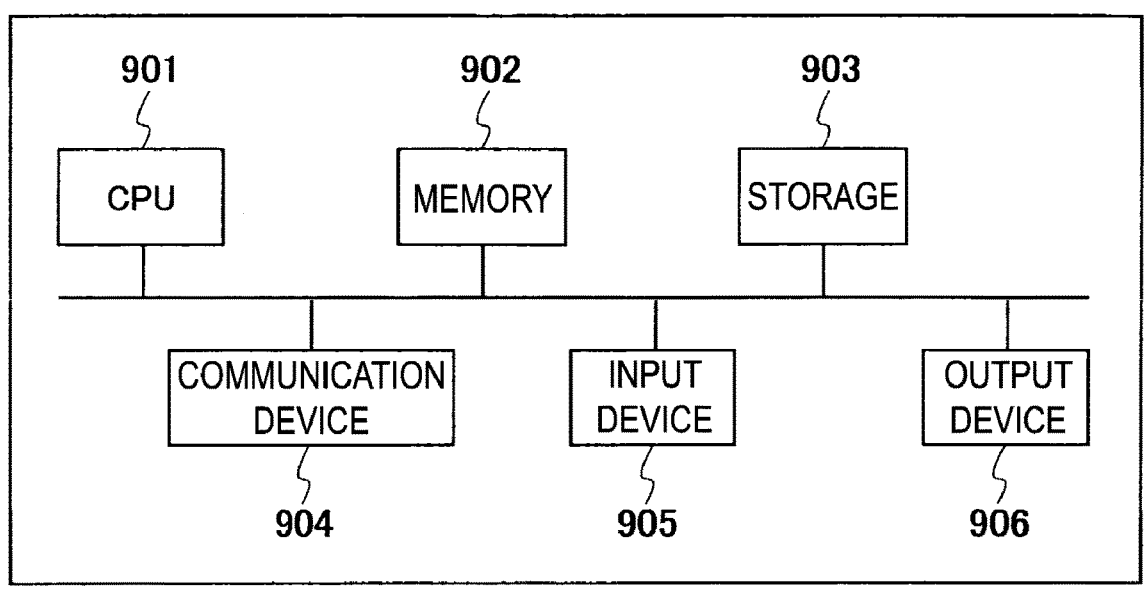
FIG. 4 illustrates an example of a hardware configuration.

In the above-described E-CSCF 3, for example, a general-purpose computer system illustrated in FIG. 4 can be used. The illustrated computer system includes a central processing unit (CPU: processor) 901, a memory 902, a storage 903 (hard disk drive (HDD) or solid state drive (SSD)), a communication device 904, an input device 905, and an output device 906. The memory 902 and the storage 903 are storage devices. In the computer system, the CPU 901 executes a program for the E-CSCF 3 loaded on the memory 902, so that each function of the E-CSCF 3 is realized.

The E-CSCF 3 may be mounted as one computer or may be mounted as a plurality of computers. The E-CSCF 3 may be a virtual machine mounted on a computer.

The program for the E-CSCF 3 can be stored on a computer-readable recording medium such as an HDD, an SSD, a Universal Serial Bus (USB) memory, a compact disc (CD), or a digital versatile disc (DVD) or can also be delivered via a network.

The present disclosure is not limited to the foregoing embodiments and modified examples and can be modified variously within the scope of the present disclosure without departing from the gist of the present disclosure.

REFERENCE SIGNS LIST

1 Terminal
2 Terminal accommodation device

21 Calling unit
22 SIM
3 E-CSCF (call processing device)
31 Conversion unit
32 Connection unit
33 Address notification unit
34 Conversion table
4 Address server
41 Management unit
42 Address DB
5 S-CSCF
6 Emergency service
61 Reception stand

The invention claimed is:

1. A call processing device, comprising:
a processor; and
a memory device storing instructions that, when executed by the processor, configure the processor to:
receive an emergency call from a land line telephone terminal through a terminal accommodation device using a wireless access line, wherein a mobile number of the terminal accommodation device is set as a caller number of the emergency call;
convert the caller number of the emergency call into a land line telephone number of the land line telephone terminal;
connect the emergency call with the land line telephone number to an emergency service;
acquire a physical address associated with the land line telephone number; and
notify the emergency service of the land line telephone number and the physical address.

2. The call processing device according to claim 1, the processor is further configured to:
store the mobile number of the terminal accommodation device and the land line telephone number of the land line telephone terminal in association with each other,
wherein the processor is configured to convert the mobile number set as the caller number of the emergency call into the land line telephone number of the land line telephone terminal.

3. A caller number conversion method performed by a call processing device, the method comprising:
receiving an emergency call from a land line telephone terminal through a terminal accommodation device using a wireless access line, wherein a mobile number of the terminal accommodation device is set as a caller number of the emergency call;
converting the caller number of the emergency call into a land line telephone number of the land line telephone terminal;
connecting the emergency call with the land line telephone number to an emergency service;
acquiring a physical address associated with land line telephone number; and
notifying the emergency service of the land line telephone number and the physical address.

4. The caller number conversion method according to claim 3,
wherein the call processing device includes a processor configured to store the mobile number of the terminal accommodation device and the land line telephone number of the land line telephone terminal in association with each other, and
in the converting of the caller number of the emergency call, the mobile number set as the caller number of the emergency call is converted into the land line telephone number of the land line telephone terminal.

5. A non-transitory computer readable medium causing a computer to operate as the call processing device according to claim 1.

6. A non-transitory computer readable medium causing a computer to operate as the call processing device according to claim 2.

7. The call processing device of claim 1, the mobile number has a "0A0" format, and the land line telephone number has a "0AB-J" format.

8. The call processing device of claim 1, notifying the emergency service of the land line telephone number and the physical address configures the processor to transmit the land line telephone number and the physical address to the emergency service using Hypertext Transfer Protocol (HTTP) POST.

* * * * *